United States Patent
Cobb

(10) Patent No.: US 8,024,472 B1
(45) Date of Patent: Sep. 20, 2011

(54) THIRD PARTY VERIFICATION USING OVERRIDE IP ADDRESSES

(75) Inventor: Jonathan Cobb, Oakland, CA (US)

(73) Assignee: Limelight Networks, Inc., Tempe, AZ (US)

( * ) Notice: Subject to any disclaimer, the term of this patent is extended or adjusted under 35 U.S.C. 154(b) by 128 days.

(21) Appl. No.: 11/904,327

(22) Filed: Sep. 25, 2007

(51) Int. Cl.
*G06F 15/16* (2006.01)

(52) U.S. Cl. ........ 709/229; 709/203; 709/224; 709/227; 709/228; 725/4

(58) Field of Classification Search ............ 709/229
See application file for complete search history.

(56) References Cited

U.S. PATENT DOCUMENTS

| | | | | |
|---|---|---|---|---|
| 6,167,446 A | * | 12/2000 | Lister et al. | 709/223 |
| 2005/0078668 A1 | * | 4/2005 | Wittenberg et al. | 370/389 |
| 2005/0172309 A1 | * | 8/2005 | Risan et al. | 725/1 |

* cited by examiner

*Primary Examiner* — Yves Dalencourt
(74) *Attorney, Agent, or Firm* — Kilpatrick Townsend & Stockton LLP

(57) ABSTRACT

Techniques for third party verification using override IP addresses is described, including detecting a request header from an endpoint, the request header being associated with a request for a media file, initiating a download of the media file to the endpoint, evaluating the request header to identify an address associated with the endpoint, generating a notification comprising the address, the notification being configured to indicate the address overrides a source address identified by a field in a packet associated with the request header, and sending the notification to report data associated with the media file, wherein the address overrides the source address to identify a source of the request.

17 Claims, 6 Drawing Sheets

THIRD PARTY VERIFICATION USING OVERRIDE IP ADDRESSES

FIELD OF THE INVENTION

The present invention relates generally to computer programs and software. More specifically, techniques for third party verification using override IP addresses are described.

BACKGROUND OF THE INVENTION

Measuring parameters associated with the performance of a website is a valuable function for determining various characteristics associated with the content. Content may include media files (e.g., audio, video, images, graphics, or a combination thereof), which may be delivered to an executable environment such as a web browser or web browsing application. However, conventional techniques for measuring web analytics are problematic and limited.

In conventional web browsing environments, performance characteristics (e.g., number of downloads, when a download starts/ends, length of download, type of content, file name, date/time, and others) are typically measured using a program written in JavaScript, enabling a "ping" or "callback," which involves sending a small amount of data, typically sent as a set of data packets, back to the source (i.e., server) of a downloaded file. Characteristics such as an Internet Protocol (IP) address, user agent, software version, operating system (OS) version, number of views, downloads, and other information about an end-user (i.e., client or destination) environment can be measured or gathered using conventional techniques. In conventional web browsing environments, when a web page is requested, a JavaScript program reports characteristics or metrics ("metrics") about a requested file. However, other applications (e.g., media players) can run offline (i.e., not connected to a data network such as the Internet), which prevents data from being sent back to a server for purposes of callbacks and gathering metrics. Further, while some conventional techniques allow reporting from media playing environments when a data connection is re-established, metrics are not reported in real-time. Still further, conventional programming techniques such as JavaScript cannot be used to develop programs for monitoring, gathering, or reporting on metrics outside of a web browsing environment. For example, the number of times a media file is played cannot be tracked when played in a media player that does not have a data connection over which it can report metrics back to a server.

Other problems associated with conventional techniques for gathering metrics on media files involve inaccurate reporting. For example, hypertext transfer protocol (HTTP) requests are often inaccurate because HTTP request headers often include a source address that provides the address of a server and not the actual end user. Conventional techniques often report a network address that is not the actual end-user (i.e., client) address. Thus, conventional reporting and analytics software may erroneously report the source of a media file (i.e., server) as the destination and fail to identify the actual location or destination of a media file download.

Thus, a solution for verifying media file metrics without the limitations of conventional techniques is needed.

BRIEF DESCRIPTION OF THE DRAWINGS

Various examples are disclosed in the following detailed description and the accompanying drawings.

DETAILED DESCRIPTION

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the embodiments has not been described in detail to avoid unnecessarily obscuring the description.

In some examples, the described techniques may be implemented as a computer program or application ("application") or as a module or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Flex™, Java™, Javascript™, Ajax, COBOL, Fortran, ADA, binary, XML, HTML, DHTML, XHTML, HTTP, XSL, XSLT, XMPP, WSDL, and others. Design, publishing, visual effects, and other types of applications such as Dreamweaver®, Shockwave®, Flash®, Fireworks®, and others may also be used to implement the described techniques. The described techniques may be varied and are not limited to the examples or descriptions provided.

Figure 1:
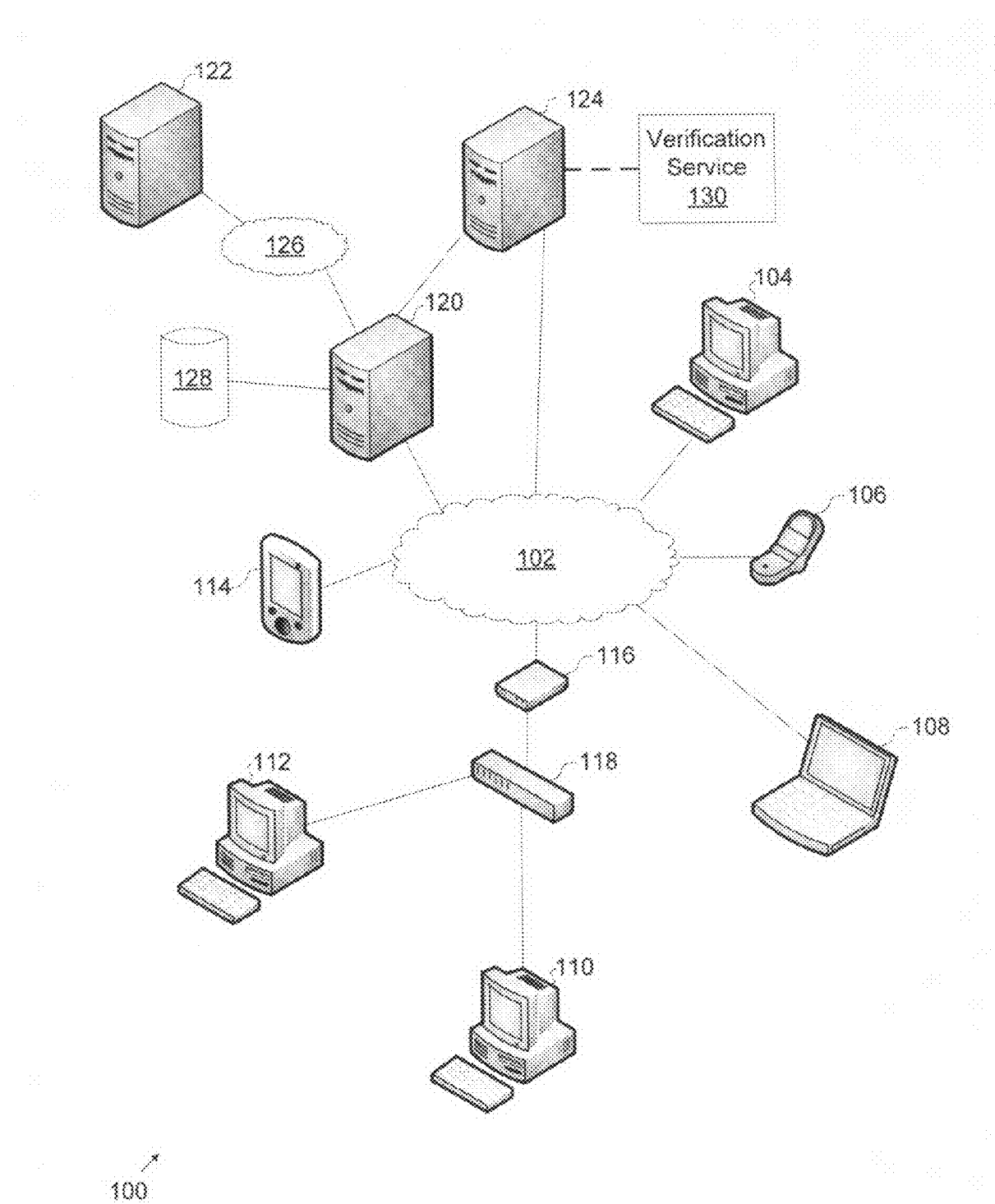
FIG. 1 illustrates an exemplary system for third party verification using overriding IP addresses.

Techniques for third party verification using override IP addresses are described. In some examples, downloads of media files (e.g., music, audio, video, images, pictures, photos, and others) may be tracked for reporting, performance, traffic, and other analytical purposes using third party verification by using pre-set rules or parameters to determine when to trigger FIG. 1 illustrates an exemplary system for third party verification using overriding IP addresses. Here, system 100 includes network 102, media clients 104-114, router 116, switch 118, server 120, media servers 120-124, network 126, database 128, and verification service 130. In some examples, media clients 104-114 may be clients, peers, or other endpoint (i.e., devices) that are configured to request, download, and play media files. As examples, media clients 104-114 may be wired, wireless, fixed, mobile, or other types of endpoint, processor-based devices that are configured to request, download, and play various types of media files in different media formats. Media formats may be any type of format that is used to render, deliver, play, download, or otherwise manipulate audio, video, music, feeds (e.g., really simple syndication (RSS)), text, images, pictures, or a combination thereof. Likewise, media servers 120-122 and server 124 are servers or other processor-based devices that are configured to serve (i.e., send in response to one or more requests) media files or any other type of data requested by media clients 104-114. The number of elements (e.g., network 102, media clients 104-114, router 116, switch 118, media servers 120-122, server 124, network 126, database 128, and verification service 130) may be varied and are not limited to the types and numbers shown and described, which are arbitrary and provided for purposes of illustration.

Here, system 100 may be implemented to enable media clients 104-114 to request media files for download, streaming, or access from media servers 120-122 or server 124. For example, a wireless mobile device (e.g., media clients 106 or 114) may request a podcast to be streamed or downloaded from one or more of media servers 120-124. When requested, a callback (i.e., a message including one or more data packets structured according to any type of data transmission protocol (e.g., TCP, IP, UDP, HTTP, and others) and having information such as IP address, host address, HTTP information, and other information beyond that of a traffic log) may be sent from one or more of media servers 120-122 to verification service 130 implemented on server 124. As an example, verification service 130 may be a process or set of processes implemented in a standalone or distributed architecture that enables a server, client, or peer to verify (i.e., determine) one or more characteristics associated with a media file. In other words processes, sub-processes, modules, applications, routines, or the like may be implemented on a single processor (e.g., server 124) or multiple processors or machines. In this example, verification service 124 is installed on server 124, which is in data communication with server 120. Further, server 120 may also be in data communication with server 122 across network 126. Direct or indirection connections or couplings may be used to place media clients 104-114 and media servers 120-124 in data communication with each other. Verification service 130, in some examples, may be used to verify (i.e., determine) various characteristics or parameters associated with serving media files from media servers 120-122 to media clients 104-114. For example, when a media file is accessed, a callback (i.e., a data call made to verification service 130 on server 124 when a media file is requested, downloaded, or otherwise accessed from media server 120) may be made to verification service 130, which stores or records data for traffic and performance analysis purposes. Further, stored data may be retrieved or accessed by a system administrator, subscriber, or other user of verification service 130. In some examples, reports may also be generated by verification service 130 about various characteristics or parameters associated with a media file. Examples of types of characteristics or parameters ("parameters") that may be gathered by verification service and reported are number of downloads, addresses associated with download requests via HTTP request headers ("request headers"), source addresses, destination addresses, length of download, download file name, download size, date/time of download, and any other information or data associated with a media file.

As an example, HTTP headers (e.g., HTTP request headers ("request headers")) may be modified to send override IP address indicated as an IP address, but in an HTTP message or packet format. In some examples, IP addresses may be read or retrieved from a layer (i.e., IP layer) of a protocol stack in order to retrieve the actual end-user IP address (i.e., override IP address) for a given media client. Any type of protocol (e.g., HTTP, TCP, IP, UDP, and others) format may be used to send HTTP header information with override IP addresses. The above-described elements may be varied in number, function, design, layout, configuration, or implementation and are not limited to the examples shown and described.

Figure 2:
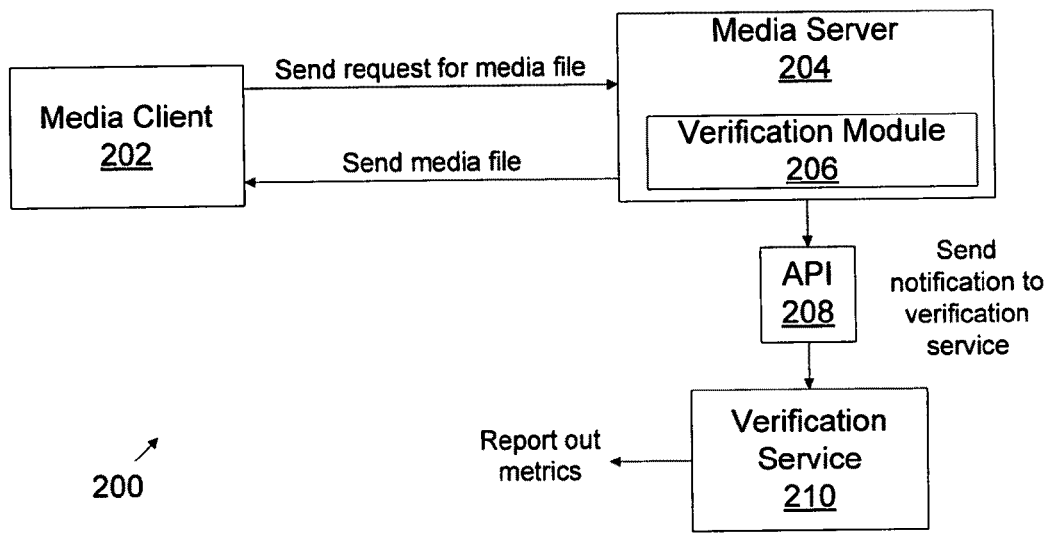
FIG. 2 illustrates an exemplary media system for third party verification using overriding IP addresses.

FIG. 2 illustrates an exemplary media system for third party verification using overriding IP addresses. Here, media system 200 includes media client 202, media server 204, verification module 206, application programming interface ("API") 208, and verification service 210. In some examples, directional arrows provided to illustrate, but not limit, data flow between media client 202, media server 204, verification module 206, application programming interface ("API") 208, and verification service 210. As an example, a request for a media file may be sent from media client 202 to media server 204. When received, the request may be further evaluated by verification module 206, which sends a notification, message or other data communication construct ("notification") to verification service 210 over API 208. In other examples, notification and message may be used interchangeably to refer to any data that is exchanged between verification module 206, and verification service 210. API 208 may be an application interface or set of routines that allow media server 204 to be tracked (i.e., for traffic, performance, and other analytical purposes) by verification service 210. In some examples, verification service 210 may be implemented similarly to verification service 130 (FIG. 1), as described above.

When a media file is requested, in some examples, by media client 202, media server 204 sends the requested media file, if available, to media client 202. Verification module 206 also sends a notification to verification service 210 to report the request and/or download of a media file. Verification module 206 may be a program, application, routine, process, or a set thereof that is used to gather parameters associated with a media file from media server 204. In other example, verification module 206 may be a distributed feature of verification services 210. In still other examples, functionality provided by verification module 206 may be incorporated, integrated, or otherwise included with verification service 210. Parameters gathered by verification service 210 may be reported out to system administrators, subscribers, applications, or other users of verification service 210 and information and analysis provided by it.

Here, when a media file is requested for download from media server 204, verification service 210 may be notified (i.e., by receiving a notification from verification module 206) of various information (e.g., media file name, location, address, size, date/time of request, date/time of download initiation, date/time of download completion, and others). When a request from media client 202 is received, verification service 210 and/or verification module 206 may evaluate a request header associated with a data packet structured according to HTTP. During the evaluation, an address for media client 202 may be determined and instead of reporting the IP address of media server 204 to verification service 210, the actual end-user IP address of media client 202 may be reported. When sending a message to verification service 210, the actual end-user (i.e., media client 202) IP address may be included (i.e., supplemented) in data packets that are provided by media client 202 to media server 204. Various techniques for adding the actual end-user IP address may be used and are not limited to any specific example. For example, the actual end-user IP address may be added to the payload or user data portion of a data packet. As another example, optional fields may be used to add the actual end-user IP address. Further, the actual end-user IP address may be added to any field in a data packet formatted using HTTP or any other data communication protocol using special flags, operators, or other indicators. The type of special flag, operator, or other indicator is not a limiting feature of the techniques described herein and may be varied accordingly.

When a data packet having the actual end-user IP address is sent from verification module 206 to verification service 210, logic (described below in connection with FIG. 3) implemented on verification service 210 is configured to interpret the special flag, operator, or other indicator to identify the actual end-user IP address. Once identified, the actual-end user IP address is used to store, file, or otherwise record data associated with the media file sent from media server 204 to media client 202. Thus, a source (i.e., network IP) address in a data packet or stream sent from media server 204 to verification service 210 may be overridden by the actual end-user IP address by logic included in API 208, verification module 206, or verification service 210. In other examples, verification module 206 may be eliminated and instead implemented as functionality included in verification service 210. By identifying the actual end-user IP address sending the HTTP request header to media server 204, verification service 210 can accurately associate data, metrics, parameters, and analysis with media files requested and downloaded, instead of using a network (e.g., IP) address for media server 204, which can be inaccurate. The above-described elements may be varied in number, function, design, layout, configuration, or implementation and are not limited to the examples shown and described.

Figure 3:
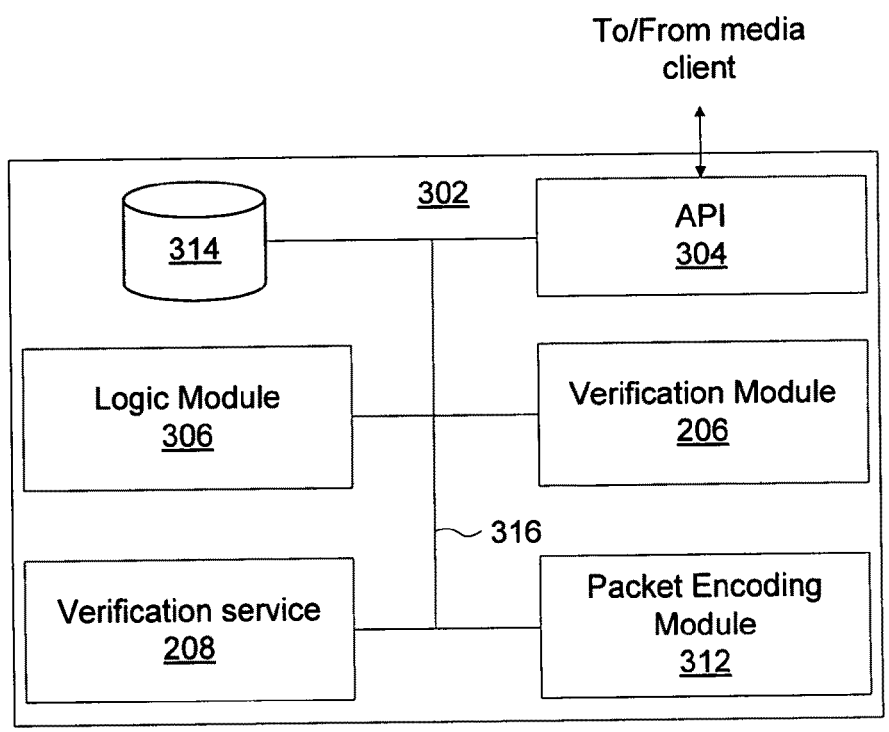
FIG. 3 illustrates an exemplary application architecture for third party verification using overriding IP addresses.

FIG. 3 illustrates an exemplary application architecture for third party verification using overriding IP addresses. Here, verification application 302 includes API 304, logic module 306, packet encoding module 312, database 314, and bus 316. Data transferred among API 304, logic module 306, packet encoding module 312, and database 314 may be transferred along bus 316, which may also be implemented across one or more data networks (e.g., network 102, 126 (FIG. 1)). Also included are verification module 206 (FIG. 2) and verification service 208 (FIG. 2), which may be implemented to function as described above in connection with FIG. 2.

In some examples, data is sent or received by verification application 302 using API 304, which may be implemented to provide routines that specify how data should be received or sent between verification application 302 and, for example, media server 204 (FIG. 2). When an HTTP request header is detected, verification module 206 notifies verification service 208 and includes the actual end-user IP address in a notification message using techniques such as those described above. Packet encoding module 312 may be configured to add the actual end-user IP address in a message along with an indicator to override a default source or network address found in a field of the HTTP request header. Notification messages or data sent to verification service 208 are encoded, decoded, or evaluated by packet encoding module 312 to determine whether an actual end-user IP address has been included by verification module 206, which may be implemented on media server 204 (FIG. 2). If an actual end-user IP address has been included in a notification sent by verification module (i.e., media server 204) to verification service 208, then the actual end-user IP address may be used to override the network or source address of the request from media client 202 (FIG. 2). Thus, data associated with the actual end-user IP address and the requested media file (not shown) may be recorded or stored ("stored") in database 314, which may be implemented as an individual data repository or as multiple data repositories. By recording data related to an actual end-user IP address as opposed to the default source (i.e., network) address found in a network packet, parameters associated with a media file are more accurately reported for analysis and verification purposes. In some examples, database 314 may be a storage area network, redundant array of independent disks (RAID), hard drive, non-volatile memory, repository, or any other type of storage array or facility. The above-described elements may be varied in number, function, design, layout, configuration, or implementation and are not limited to the examples shown and described.

Figure 4A:
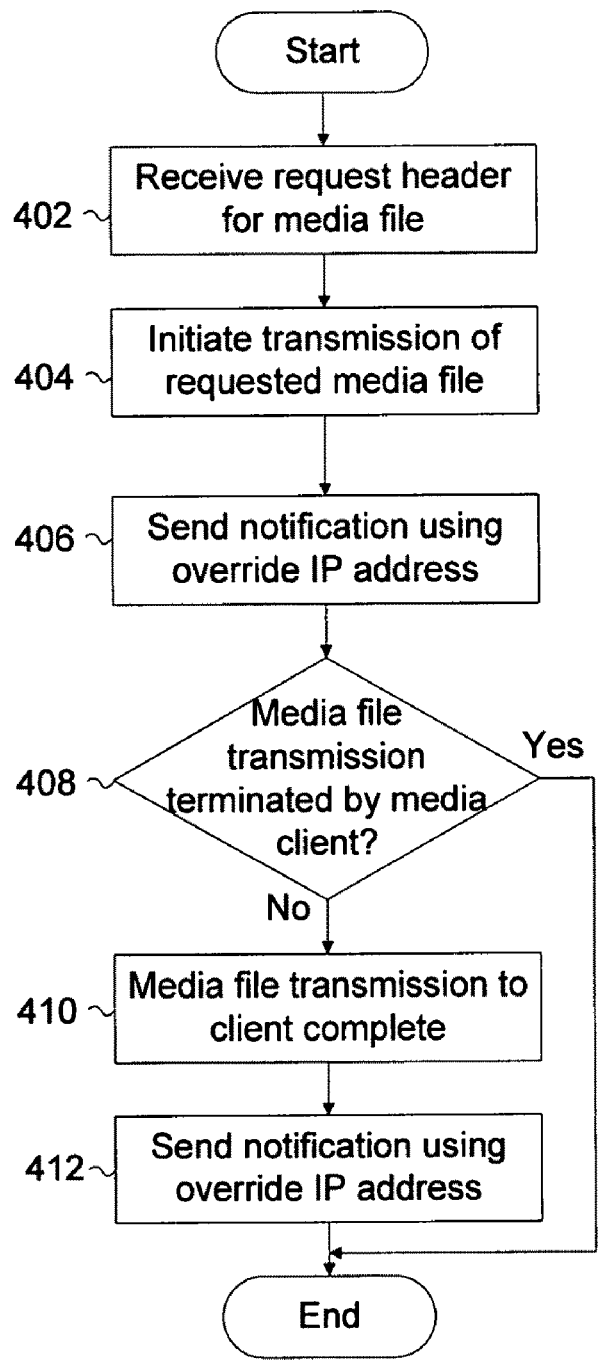
FIG. 4A illustrates an exemplary process for third party verification using overriding IP addresses.

FIG. 4A illustrates an exemplary process for third party verification using overriding IP addresses. Here, a request header associated with a request for a media file is received (402). In response to the request and if the media file is available, transmission of the media file is initiated (404). Once initiated, notification is sent, for example, from media server 204 (FIG. 2) to verification service 210 via API 208 (406). Alternatively, if a large number of downloads are observed (i.e., recorded or monitored by verification module 206 or verification service 210), HTTP specifications (e.g., Keep-alive) may be used to keep a connection open between media client 202 and media server 204 or media server 204 to verification service 210 via API 208. Thus, notifications to verification service 210 may be spooled to compensate for high volume downloads, using fault tolerance techniques to ensure latencies to date/time information are minimized or accurately recorded. In other examples, notification may be sent when a download is initiated, completed, or when a request is received. Notifications may be sent at any point and are not limited to the examples provided.

Referring back to FIG. 4A, a determination is made as to whether the media file transmission was terminated by media client 202 (FIG. 2) (408). In some examples, termination of a media file download may be caused by a user stopping the playing or download of a given file. In other examples, termination of a media file download may be caused by the loss of a data network connection. In still other examples, termination of a media file download prior to completion may occur for other reasons than those stated above. Further, a notification to a verification service may be sent when a download aborted or if a download request came from a malicious IP address (i.e., known or otherwise). Still further, rules may be specified to determine when third party verification service is activated (i.e., initiates recording of data associated with the request or download of a media file). If the transmission (i.e., download) of the download is terminated by the media client (e.g., a user stops the download), then the process ends. If the transmission is not terminated by the media client, then the transmission continues to the media client until the download is completed (410). Once completed, a notification may be sent to verification service 210 using an override IP address (i.e., an actual end-user IP address that is indicated as superseding or replacing the source address identified in a network packet request header), as described above (412). The above-described process may be varied in order, steps, function, or implementation and are not limited to the examples shown and described.

Figure 4B:
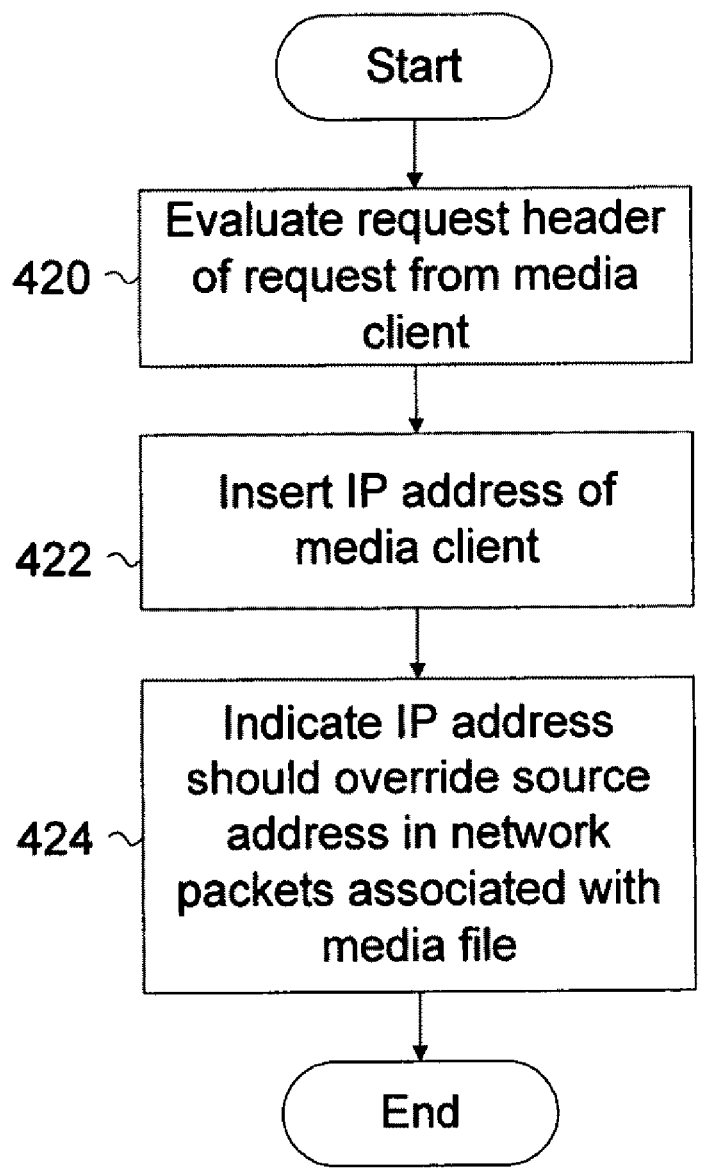
FIG. 4B illustrates a further exemplary process for third party verification using overriding IP addresses.

FIG. 4B illustrates a further exemplary process for third party verification using overriding IP addresses. Here, a further process for generating (i.e., sending) a notification from media server 204 to verification service 210 is described. In some examples, a request header is evaluated (420). Once evaluated to determine if the request header includes a source (i.e., network) address for media server 202 (FIG. 2), the actual end-user IP address of the requesting endpoint (i.e., media client 202 (FIG. 2)) is inserted into a notification sent to verification service 210 (FIG. 2) (422). Once inserted, an indication to override the source address with the actual end-user IP address is also provided in the notification to verification service 210 (FIG. 2) (424). In some examples, an indication may be a flag, signal, operator, or other data packet element that may be used to indicate or identify a special value that should be used, when detected by verification service 210, to override the source address field in an HTTP request header or other data packet. In other examples, indications may be different and implemented differently than described above. Further, the above-described process may be varied in order, steps, function, or implementation and are not limited to the examples shown and described.

Figure 5:
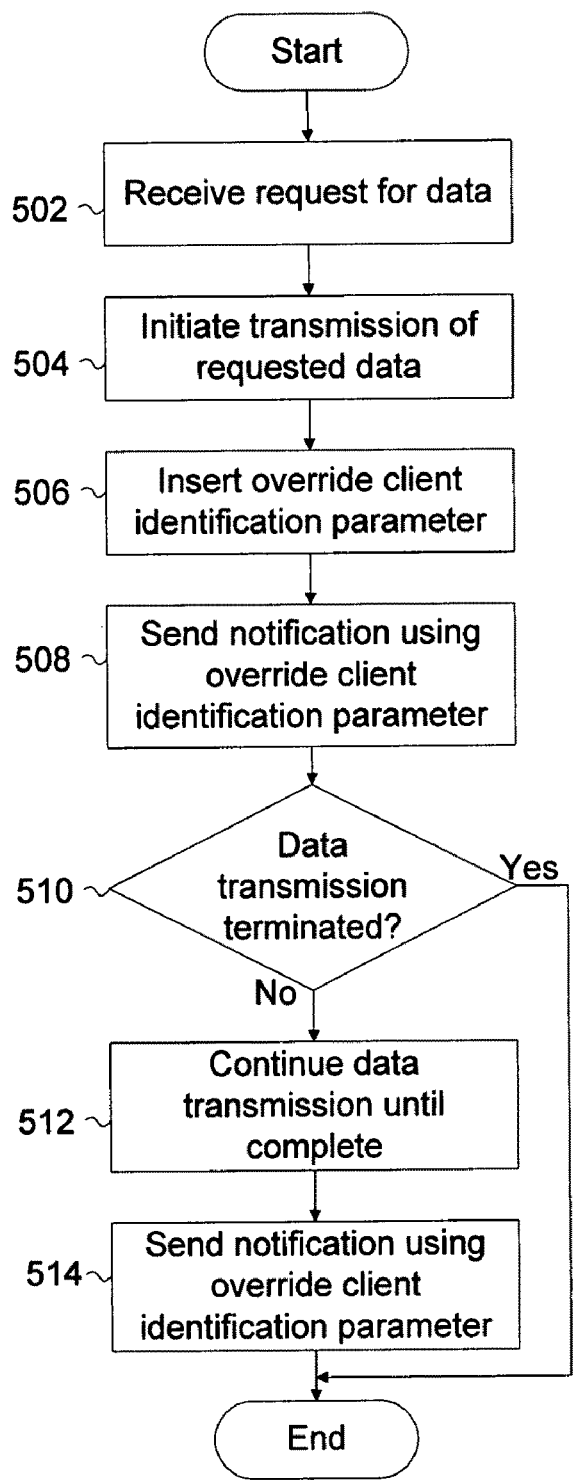
FIG. 5 illustrates an alternative exemplary process for third party verification using overriding IP addresses.

FIG. 5 illustrates an alternative exemplary process for third party verification using overriding IP addresses. Here, a request for data (e.g., media file) is received (502). Once received, the request is used to trigger the initiation of the data download to the requesting endpoint (504). A client identification parameter (e.g., address, location, or other parameter) may be overridden by inserting an override client identification parameter into one or more data packets associated with the requested data (506). Once overridden, a notification containing the override client identification parameter is sent to a verification service (e.g., verification service 210 (FIG. 2)) (508). A determination is made as to whether the data transmission was terminated (510). If the transmission (i.e., download) of the data is terminated, then the process ends. Alternatively, if the transmission is not terminated, then the download continues until the data transmission to the client or requesting endpoint is complete (512). After the data transmission is complete, another notification may be sent to verification service 210 (FIG. 2) with the override client identification parameter. Thus, data indicating the file name, user agent (e.g., type of application requesting the file or other identification of the executable environment (e.g., web browser, media player, or the like)) location, duration, date/time of file access, size, actual end-user IP address, and other information associated with the downloaded file may be stored by a verification service for further use when analyzing traffic statistics, performance (e.g., number of downloads in a given period of time) or the like. The above-described process may be varied in order, steps, function, or implementation and are not limited to the examples shown and described.

Figure 6:
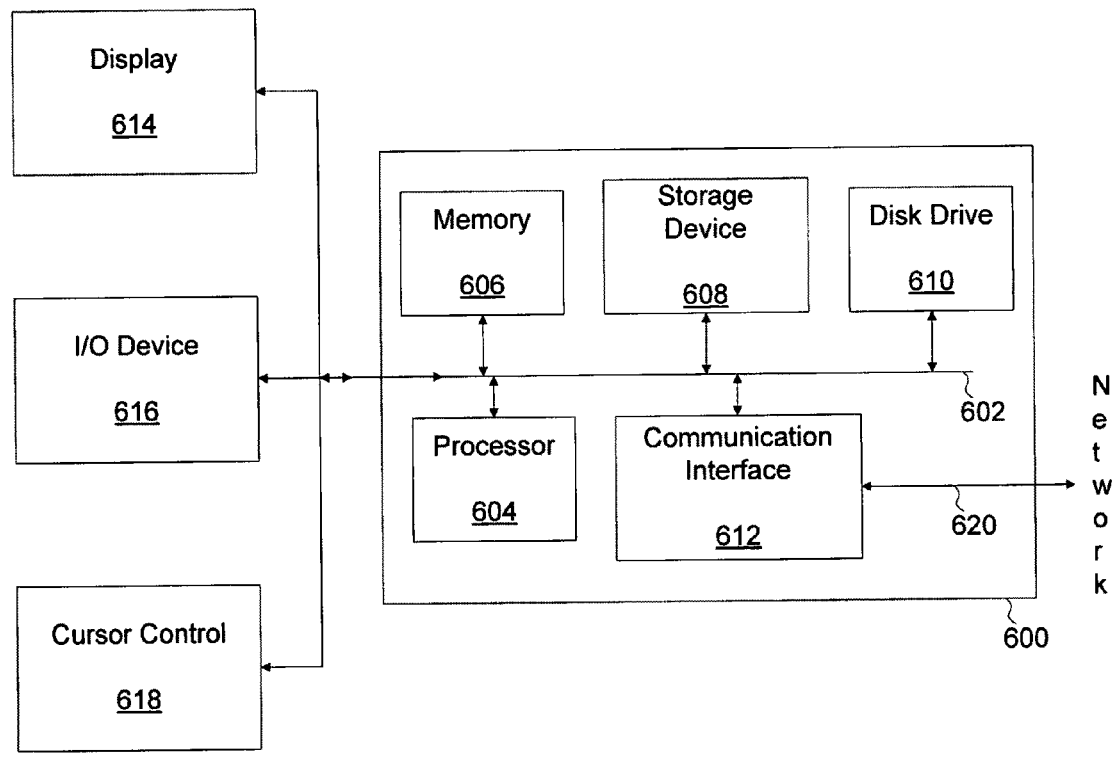
FIG. 6 illustrates an exemplary computer system suitable for third party verification using overriding IP addresses.

FIG. 6 illustrates an exemplary computer system suitable for third party verification using overriding IP addresses. In some examples, computer system 600 may be used to implement computer programs, applications, methods, processes, or other software to perform the above-described techniques. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and cursor control 618 (e.g., mouse or trackball).

According to some examples, computer system 600 performs specific operations by processor 604 executing one or more sequences of one or more instructions stored in system memory 606. Such instructions may be read into system memory 606 from another computer readable medium, such as static storage device 608 or disk drive 610. In some examples, hard-wired circuitry may be used in place of or in combination with software instructions for implementation.

The term "computer readable medium" refers to any medium that participates in providing instructions to processor 604 for execution. Such a medium may take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 600. According to some examples, two or more computer systems 600 coupled by communication link 620 (e.g., LAN, PSTN, or wireless network) may perform the sequence of instructions in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed is:

1. A method comprising:

detecting a request header sent from a media client, the request header being associated with a request for a media file, wherein the media client is associated with a first address;

initiating a download of the media file to the media client from a media server;

evaluating the request header to identify the first address associated with the media client;

generating a notification comprising a second address of the media server, the first address, and an override indicator for selectively designating the first address as a source of the notification in place of the second address associated with the media server;

sending the notification with the override indicator in one or more data packets from the media server to a verification server, the verification server being:
   separate from the media server, and
   associated with a verification service that stores data representative of traffic and/or performance analysis associated with media downloads from the media server; and sending another notification to indicate completion of the download, the another notification comprising an indication that the another notification is for the first address.

2. The method of claim 1, wherein the request header is sent from an executable environment not associated with a web browsing application.

3. The method of claim 1, wherein the request header is sent using hypertext transfer protocol.

4. The method of claim 1, wherein the media client is a client application configured to request the media file.

5. The method of claim 1, wherein the media client is an application other than a web browsing application.

6. The method of claim 1, wherein the first address is added to the request header by the media client.

7. The method of claim 1, wherein initiating the download of the media file further comprises sending the media file from the media server toward the media client.

8. The method of claim 1, wherein the notification is a callback generated by the media server to the verification server associated with the verification service.

9. The method of claim 1, wherein the notification is a HTTP message.

10. The method of claim 9, wherein a format of the HTTP message corresponds to an application programming interface (API) of the verification server.

11. The method of claim 1, further comprising:
    detecting that the download of the media file to the media client is terminated prior to completion; and
    sending a second notification to the verification server, the second notification comprising the first address associated with the media client and information indicating that the download of the media file was terminated prior to completion.

12. A method, comprising:
    receiving a request header from a media client, the request header being associated with a request for a media file, wherein the media client is associated with a first address;
    initiating a download of the media file to the media client from a media server;
    sending a notification from the media server to a verification server, the notification identifying initiation of the download, the notification comprising the first address associated with the media client, a second address associated with the media server, and an override indicator for selectively designating the first address as a source of the notification in place of the second address associated with the media server, the verification server being:
        separate from the media server, and
        associated with a verification service that generates data representative of traffic and/or performance analysis associated with media downloads from the media server;
    completing the download of the media file to the media client; and
    sending another notification to indicate completion of the download, the another notification comprising the first address.

13. The method of claim 12, wherein the first address is an IP address.

14. The method of claim 12, wherein the notification and the another notification are interpreted by the verification server to generate the data representative of traffic and/or performance analysis associated with media downloads from the media server.

15. The method of claim 12, further comprising determining the first address by evaluating the request header.

16. A system, comprising:
    a database configured to store data associated with a media file; and
    a media server configured to:
        detect a request header sent from a media client, the request header being associated with a request for the media file,
        initiate a download of the media file to the media client from the media server having a first address,
        evaluate the request header to identify a second address associated with the media client,
        generate a notification comprising the second address, the notification being configured to indicate that the second address overrides the first address as a source address of the notification, the second address being identified by a field in a packet associated with the request header,
        send the notification from the media server to a verification server to report data associated with the media file, the verification server being:
            separate from the media server, and
            associated with a verification service that generates data representative of traffic and/or performance analysis associated with media downloads from the media server; and
        sending another notification to indicate completion of the download, the another notification comprising an indication that the another notification is for the first address.

17. A computer program product embodied in a non-transitory computer readable storage medium and comprising computer instructions for:
    detecting a request header from a media client, the request header being associated with a request for a media file;
    initiating a download of the media file to the media client from a media server having a second address;
    evaluating the request header to identify a first address associated with the media client;
    generating a notification comprising the second address of the media server, the first address associated with the media client, and an override indicator for selectively designating the first address as a source of the notification in place of the second address;
    sending the notification with the override indicator in one or more data packets from the media server to a verification server, the verification server being:
        separate from the media server, and
        associated with a verification service that generates data representative of traffic and/or performance analysis associated with media downloads from the media server; and
    sending another notification to indicate completion of the download, the another notification comprising an indication that the another notification is for the first address.

* * * * *